No. 814,751. PATENTED MAR. 13, 1906.
C. WALES.
CRANK ARM SLEEVE BEARING.
APPLICATION FILED JULY 24, 1905.
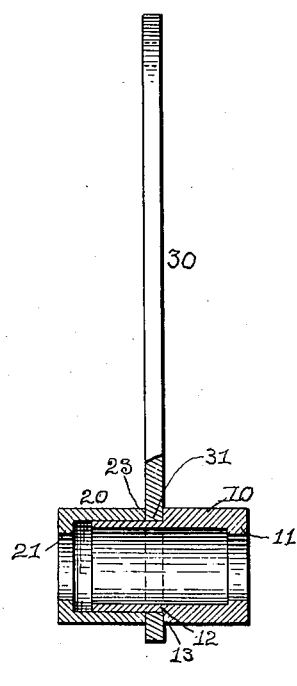
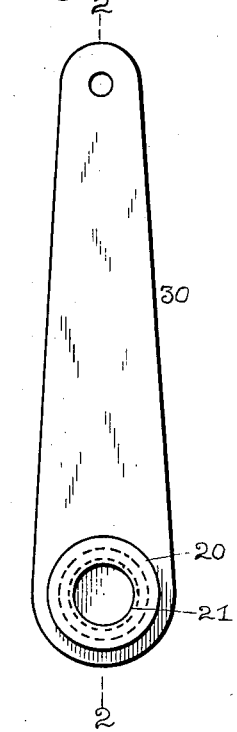
Witnesses
S. Brashears
Geo. H. Luscomb.
Charles Wales,
Inventor
By his Attorney William R. Baird

UNITED STATES PATENT OFFICE.

CHARLES WALES, OF DETROIT, MICHIGAN.

CRANK-ARM SLEEVE-BEARING.

No. 814,751.  Specification of Letters Patent.  Patented March 13, 1906.

Application filed July 24, 1905. Serial No. 271,090.

*To all whom it may concern:*

Be it known that I, CHARLES WALES, a citizen of the United States, and a resident of Detroit, in the county of Wayne and State of Michigan, have invented certain new and useful Improvements in Crank-Arm Sleeve-Bearings, of which the following is a specification.

This invention is in the nature of an improved sleeve-bearing for crank or like arms. It has heretofore been deemed necessary in the manufacture of such devices to expend a considerable amount of skilled labor and time, thereby incurring considerable expense, and such bearings having been heretofore required to be quite wide to give stability to the arm and prevent lateral wabbling and wear thereof. Furthermore, such wide sleeve-bearings when made in more than one piece were generally threaded together, thus incurring expense in cutting the necessary threads, &c. Such wide bearings also required frequent oiling or lubricating, and in cold weather especially the oil spread over the extensive surface of the bearing very often became gummy or sticky, and thus prevented the free movement of the parts.

The object of this invention is to provide a bearing of this class in the manufacture and use of which all of these difficulties are obviated and all of these objections removed, the improved bearing being relieved at the center and having two narrow bearing-surfaces only at the ends, so that the oil will not gum or clog, the parts being so formed as to be readily and rapidly produced in large quantities at a very low cost by ordinary machinery.

In the accompanying drawings, which illustrate the invention, Figure 1 represents a view showing the crank-arm in side elevation and the sleeve-bearing in end elevation. Fig. 2 represents a partial sectional view on the broken line 2 2 of Fig. 1, part of the arm being shown in edge elevation.

Referring specifically to the drawings, 10 indicates a sleeve which for the purposes of this specification may be denominated the "interior" sleeve, and 20 a sleeve which will be designated the "exterior" sleeve, each of which is provided at its outer end with an annular inwardly-extending flange, as at 11 and 21, the inner edges of these flanges being the only portions of the sleeves which bear upon the shaft when the parts are assembled and mounted thereon.

The inner diameter of the interior sleeve 10 from the flange 11 to its opposite end is preferably the same throughout, but not necessarily so; but its outer diameter is reduced from near its mid-length, as at 12, to its opposite end, a shoulder 13 being thus formed at the point of junction of the two diameters.

The inner diameter of the exterior sleeve is of a size to permit of that sleeve being forced over the reduced portion 12 of the sleeve 10, and its outer diameter is preferably, but not necessarily, about the same as the diameter of the larger portion of the interior sleeve 10.

30 indicates a crank-arm or like device, which is preferably formed by punching or stamping out of a sheet of metal, and it is provided with an opening, preferably near its larger end, as at 31, of a diameter to fit snugly and tightly on the outside of the reduced portion 12 of the sleeve 10.

To assemble the parts, the arm 30 is slipped on the end of portion 12 of sleeve 10 and forced by driving or otherwise thereupon until it abuts the shoulder 13. The sleeve 20 is then forced by driving or otherwise upon the part 12 of sleeve 10 until its end 23 abuts the arm 30 and firmly clamps it between said end and the shoulder 13.

The interior diameters of the flanges 11 and 21 are of a size to fit properly upon the shaft, (not shown,) and when the bearing is in place on the shaft these flanges are the only parts in contact with the shaft, thereby assuring easy movement thereon. The effect for stability and steadiness is fully equal to that of a bearing as broad as the distance of the flanges apart, while the liability of the oil to become gummy and clog on such an extended surface is avoided.

The sleeves may be turned out in quantities upon automatic lathes or screw-machines and the arms stamped or punched from a sheet at a single stroke, thus enabling the manufacturer to produce these parts quickly and rapidly at the lowest possible cost.

What I claim as new is—

1. A sleeve-bearing for crank-arms, comprising an interior sleeve provided with an inwardly-projecting annular bearing-flange at one end and reduced in outer diameter toward the opposite end forming a shoulder on the outside at the junction of the different diameters, and an exterior sleeve also provided with an inwardly-projecting annular bearing-flange at one end, its main body being of a size to permit it to be forced over the reduced portion of the interior sleeve, whereby an arm, slipped on said reduced portion, may be held between the shoulder and the end of the exterior sleeve.

2. The combination, with an interior sleeve provided with an inwardly-projecting annular bearing-flange at one end and having its outer diameter reduced toward the opposite end forming a shoulder on its outside, of a crank-arm having a suitable opening fitted over the reduced end and resting against the shoulder, and an exterior sleeve provided with a like inwardly-projecting annular bearing-flange at one end forced over the reduced portion of the interior sleeve and clamping the crank-arm between the inner end of the exterior sleeve and said shoulder.

Witness my hand, this 19th day of July, 1905, at the city of New York, in the county and State of New York,

CHARLES WALES.

Witnesses:
 HERMAN MEYER,
 WILLIAM R. BAIRD.